United States Patent
Roberts (10) Patent No.: US 11,739,836 B2
(45) Date of Patent: Aug. 29, 2023

(54) FLYWEIGHTS, CVT CLUTCHES, AND METHODS OF TUNING FLYWEIGHTS

(71) Applicant: Starting Line Products, Inc., Idaho Falls, ID (US)

(72) Inventor: Allen Roberts, Idaho Falls, ID (US)

(73) Assignee: Starting Line Products, Inc., Idaho Falls, ID (US)

( * ) Notice: Subject to any disclaimer, the term of this patent is extended or adjusted under 35 U.S.C. 154(b) by 267 days.

(21) Appl. No.: 16/947,673

(22) Filed: Aug. 12, 2020

(65) Prior Publication Data

US 2022/0049767 A1    Feb. 17, 2022

(51) Int. Cl.
| | |
|---|---|
| *F16H 63/06* | (2006.01) |
| *F16H 25/18* | (2006.01) |
| *F16H 55/56* | (2006.01) |
| *F16H 61/662* | (2006.01) |

(52) U.S. Cl.
CPC .......... *F16H 63/067* (2013.01); *F16H 25/18* (2013.01); *F16H 55/563* (2013.01); *F16H 61/66245* (2013.01)

(58) Field of Classification Search
CPC . F16H 55/563; F16H 63/067; F16H 61/66245
USPC ......................................................... 474/14
See application file for complete search history.

(56) References Cited

U.S. PATENT DOCUMENTS

| | | | | |
|---|---|---|---|---|
| 3,727,478 A | * | 4/1973 | Erickson | F16H 55/563 474/14 |
| 3,971,263 A | * | 7/1976 | Beaudoin | F16H 55/563 474/93 |
| 3,996,811 A | * | 12/1976 | Reese | F16H 55/563 474/14 |
| 4,052,908 A | * | 10/1977 | Takagi | F16H 55/563 474/14 |
| 4,464,144 A | * | 8/1984 | Kobayashi | F16H 55/563 474/43 |
| 4,826,467 A | * | 5/1989 | Reese | F16H 55/563 474/14 |
| 5,326,330 A | * | 7/1994 | Bostelmann | F16H 55/563 474/14 |
| 5,562,555 A | * | 10/1996 | Peterson | F16H 55/563 192/105 CD |
| 5,795,255 A | * | 8/1998 | Hooper | F16H 61/66245 474/70 |
| 6,309,317 B1 | * | 10/2001 | Joss | F16D 43/06 474/14 |
| 6,334,826 B1 | * | 1/2002 | Takagi | F16H 55/563 474/14 |

(Continued)

*Primary Examiner* — Henry Y Liu
(74) *Attorney, Agent, or Firm* — TraskBritt (57) ABSTRACT

A flyweight comprises a body. The body of the flyweight comprises a pivot, a cam surface, and a first coupler. The first coupler is configured to selectively couple at least one first weight to the body distal from the cam surface. A flyweight comprises a body having at least 20% of its mass positioned to contribute negative torque about a pivot related to an acceleration of a CVT clutch from an idling condition. A method of tuning a flyweight comprises attaching at least one first weight to a first coupler of a body of the flyweight distal from a cam surface of the body. A CVT clutch comprises at least one flyweight with a first coupler configured to selectively couple at least one first weight to a body of the flyweight distal from a cam surface.

19 Claims, 6 Drawing Sheets

(56) References Cited

U.S. PATENT DOCUMENTS

| | | | | |
|---|---|---|---|---|
| 6,346,056 B1* | 2/2002 | Nouis | ............... | F16H 61/66272 474/14 |
| 7,726,927 B2* | 6/2010 | Cook | ................... | F16B 35/005 411/398 |
| 8,409,039 B2* | 4/2013 | Beyer | .................. | F16H 55/563 474/14 |
| 9,057,432 B1* | 6/2015 | Bouffard | ................. | F16H 55/56 |
| 9,228,644 B2* | 1/2016 | Tsukamoto | ............... | F16H 9/18 |
| 9,267,580 B2* | 2/2016 | Aitcin | ................... | F16H 63/067 |
| 9,500,264 B2* | 11/2016 | Aitcin | ....................... | F16H 9/14 |
| 9,593,759 B2* | 3/2017 | Millard | ................. | F16H 55/563 |
| 10,066,729 B2* | 9/2018 | Aitcin | ..................... | B62M 27/02 |
| 10,393,263 B2* | 8/2019 | Simpson | ............... | F16H 63/067 |
| 2002/0123400 A1* | 9/2002 | Younggren | ....... | F16H 61/66272 474/14 |
| 2004/0214668 A1* | 10/2004 | Takano | ................ | F16H 63/067 474/14 |
| 2008/0125255 A1* | 5/2008 | Heide | ................... | F16H 37/021 474/8 |
| 2009/0227404 A1* | 9/2009 | Beyer | ..................... | F16H 55/563 474/14 |
| 2012/0214626 A1* | 8/2012 | Cook | .................... | F16H 55/563 474/14 |
| 2014/0349792 A1* | 11/2014 | Aitcin | ................... | F16H 55/563 474/13 |
| 2015/0267792 A1* | 9/2015 | Hochmayr | .............. | F16H 9/125 474/14 |
| 2016/0069434 A1* | 3/2016 | Aitcin | ...................... | B62M 9/08 180/54.1 |
| 2016/0160989 A1* | 6/2016 | Millard | ................. | F16H 55/563 474/14 |
| 2017/0030454 A1* | 2/2017 | Aitcin | ...................... | F16H 55/36 |
| 2018/0238430 A1* | 8/2018 | Eck | ....................... | F16H 55/563 |
| 2021/0190182 A1* | 6/2021 | Itoo | ........................ | F16H 9/125 |
| 2021/0231211 A1* | 7/2021 | Itoo | ..................... | F16H 57/0489 |

\* cited by examiner

FLYWEIGHTS, CVT CLUTCHES, AND METHODS OF TUNING FLYWEIGHTS

TECHNICAL FIELD

Embodiments of the present disclosure relate to flyweights, CVT clutches, and related systems and methods. Embodiments of the present disclosure may specifically relate to flyweights including a coupler that is configured for the selectable addition of mass distal from a cam surface of the flyweight.

BACKGROUND

Centrifugal clutch assemblies are widely used. These clutch assemblies utilize inertial forces acting on rotating components of the centrifugal clutch assembly to engage the clutch when a motor or engine is rotating at an operating speed, such as at a certain higher rotations per minute (RPM) range, and to disengage the clutch when the motor or engine is stopped or idling, such as at a certain lower RPM range. These inertial forces are commonly referred to as "centrifugal forces" when considering the system from a rotating reference frame. When considered from a rotating reference frame, centrifugal forces are forces that are apparent in a radial direction (i.e., outward from the axis of rotation).

Figure 1:
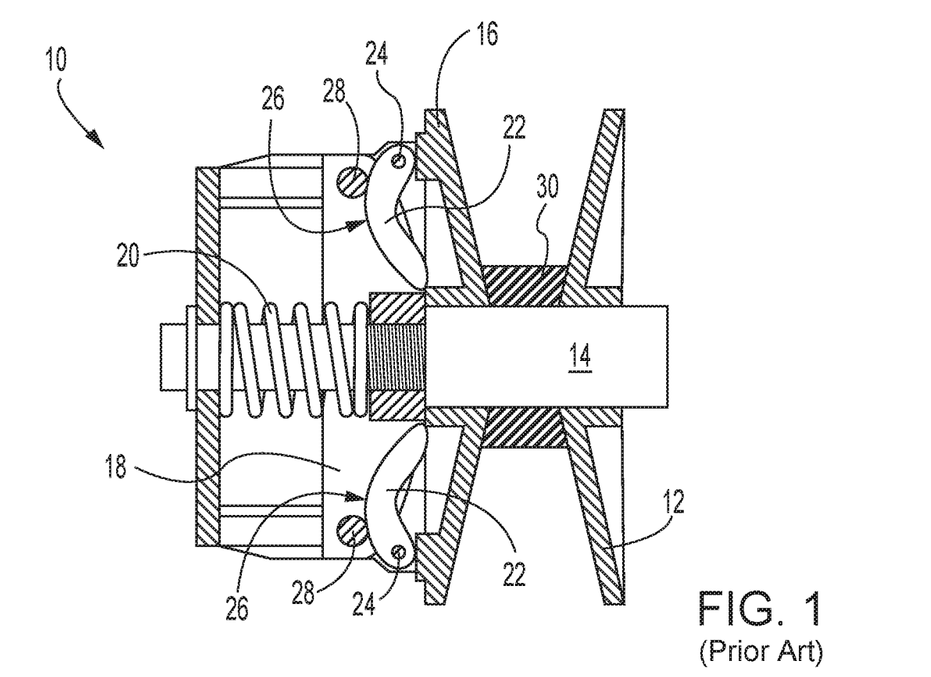
FIG. 1 is a partial cross-sectional view of a prior art CVT clutch in an initial, unengaged position.

A continuously variable transmission (CVT), such as those commonly used in snowmobiles, utilizes a specific type of centrifugal clutch not only to engage and disengage an engine output shaft (e.g., a crank shaft) from a driven shaft, but also to operate with a drive belt and a secondary clutch to change gear ratios during operation. As shown in FIG. 1, a CVT clutch 10 includes a stationary sheave 12 that is coupled to an output shaft 14 of an engine, and a movable sheave 16 that is mounted to the output shaft 14 and movable in an axial direction toward and away from the stationary sheave 12. A spider assembly 18 is mounted to the output shaft 14 and stationary relative to the output shaft 14, as is the stationary sheave 12, and a spring 20 is positioned on the output shaft 14 to provide a biasing force on the movable sheave 16 away from the stationary sheave 12. A plurality of flyweights 22 may be mounted to the movable sheave 16 via pins 24, and the flyweights 22 may rotate freely relative to the movable sheave 16. A cam surface 26 of each flyweight 22 may be positioned adjacent to a corresponding roller 28 of the spider assembly 18.

As shown in FIG. 1, when the engine is idling and the output shaft 14 of the engine is rotating at a low RPM, the biasing force of the spring 20 may be sufficient to maintain the movable sheave 16 sufficiently spaced from the stationary sheave 12 that a drive belt 30 positioned therebetween may not engage with the sidewalls of the movable sheave 16 and the stationary sheave 12, and the CVT clutch 10 may rotate freely relative to the drive belt 30.

Figure 2:
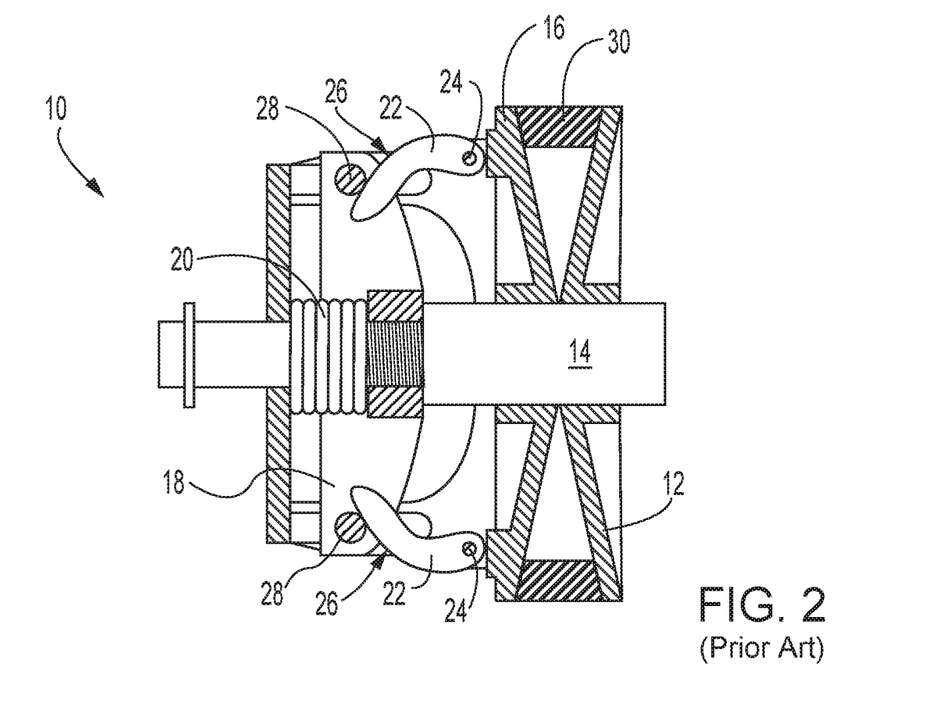
FIG. 2 is a partial cross-sectional view of the CVT clutch of FIG. 1 in an engaged position.

As shown in FIG. 2, when the speed of the engine is increased to a relatively high RPM, the centrifugal force (i.e., inertia) acting on the flyweights 22 may be sufficient to apply a force to the spider assembly 18 via the interface between the cam surface 26 and the rollers 28 to overcome the biasing force of the spring 20 and the movable sheave 16 is forced toward the stationary sheave 12 and the drive belt 30 will engage with the sidewalls of the movable sheave 16 and the stationary sheave 12 and be driven by the CVT clutch 10.

The inertial force or centrifugal force acting on a flyweight 22 can be calculated according to the equation F=m a, wherein the force (F) is equal to the mass (m) of the flyweight 22 multiplied by the acceleration (a) of the flyweight 22, which in this case the acceleration correlates to the rotational speed (e.g., RPM) of the CVT clutch 10. Accordingly, for any specific RPM, the force acting on the flyweight 22 may be increased by increasing the mass of the flyweight 22 and, conversely, the force may be decreased by decreasing the mass of the flyweight 22. For example, doubling the mass of the flyweight 22 may double the force acting on the flyweight 22 at a specific RPM. Accordingly, the mass of flyweights 22 may be adjusted or "tuned" by adding or removing mass to achieve engagement of the CVT clutch 10 at a desired RPM.

The tuning of flyweights 22 by adding or removing mass has been effective for many applications. For example, this method has been effective for tuning a CVT clutch 10 for use with a naturally-aspirated engine at high-altitude or for tuning a CVT clutch 10 for use with a naturally-aspirated engine at low-altitude. This traditional method of tuning flyweights 22 for use in CVT clutch 10 for use with engines that are not naturally aspirated, however, has come with significant tradeoffs.

An engine that has been equipped with a turbocharger may exhibit relatively high torque at high RPMs when compared to a naturally-aspirated engine. However, the same turbocharged engine may have relatively low torque at low RPMs when compared to a naturally-aspirated engine. Due to the relatively low torque at low RPMs, one might decrease the mass of the flyweights 22 to cause the clutch to engage at a higher RPM, corresponding to a higher engine torque output. The lower mass of the flyweights 22, however, will also apply a lower force at high RPMs compared to higher mass flyweights 22 and the CVT clutch 10 may not shift into higher gear ratios as quickly in the engine's mid-to-high RPM range where it exhibits its highest torque output. Accordingly, there is a tradeoff between higher horsepower output at startup "off-the-line" and higher horsepower output at the mid-to-upper RPM range, depending on the selected mass of the flyweights 22.

Accordingly, improvements on CVT clutch and flyweight design would be desirable, especially for use with engines that are not naturally aspirated, such as turbocharged engines.

SUMMARY OF DISCLOSURE

Some embodiments of the present disclosure include a flyweight comprising a body. The body of the flyweight comprises a pivot, a cam surface, and a first coupler. The first coupler is configured to selectively couple at least one first weight to the body distal from the cam surface.

In further embodiments of the present disclosure, the body further comprises a second coupler. The second coupler is configured to selectively couple at least one second weight to the body of the flyweight proximal to the cam surface.

In yet further embodiments of the present disclosure, a flyweight comprises a body including a pivot and a cam surface. At least 20% of the mass of the body is positioned to contribute negative torque about the pivot related to an acceleration of a CVT clutch from an idling condition.

Another embodiment of the present disclosure includes a method of tuning a flyweight. The method comprises attaching at least one first weight to a first coupler of a body of the flyweight distal from a cam surface of the body.

Another embodiment of the present disclosure may include a CVT clutch comprising a flyweight, and the flyweight comprising a body. The body of the flyweight comprises a pivot, a cam surface, and a first coupler. The first coupler is configured to selectively couple at least one first weight to the body distal from the cam surface.

BRIEF DESCRIPTION OF THE DRAWINGS

The present disclosure may be understood more fully by reference to the following detailed description of example embodiments, which are illustrated in the appended figures.

DETAILED DESCRIPTION

In some instances, the illustrations presented herein are not meant to be actual views of any particular device, apparatus, system, assembly, method, or component thereof, but are merely simplified schematic representations employed to describe illustrative embodiments of the disclosure. The drawings are not necessarily to scale.

As used herein, any relational term, such as "first," "second," "over," "beneath," "top," "bottom," "underlying," "up," "down," etc., is used for clarity and convenience in understanding the disclosure and accompanying drawings, and does not connote or depend on any specific preference, orientation, or order, except where the context clearly indicates otherwise. In some instances, these terms may refer to an orientation of elements as illustrated in the figures.

As used herein, the terms "vertical" and "horizontal" may refer to a drawing figure as oriented on the drawing sheet, and are in no way limiting of orientation of a feature, or any portion thereof, unless it is apparent that a particular orientation of the feature is necessary or desirable for operation in view of gravitational forces.

As used herein, the term "substantially" or "about" in reference to a given parameter means and includes to a degree that one skilled in the art would understand that the given parameter, property, or condition is met with a small degree of variance, such as within acceptable manufacturing tolerances. For example, a parameter that is substantially met may be at least 90% met, at least 95% met, at least 99% met, or even 100% met.

As used herein, the term "and/or" means and includes any and all combinations of one or more of the associated listed items.

Figure 3:
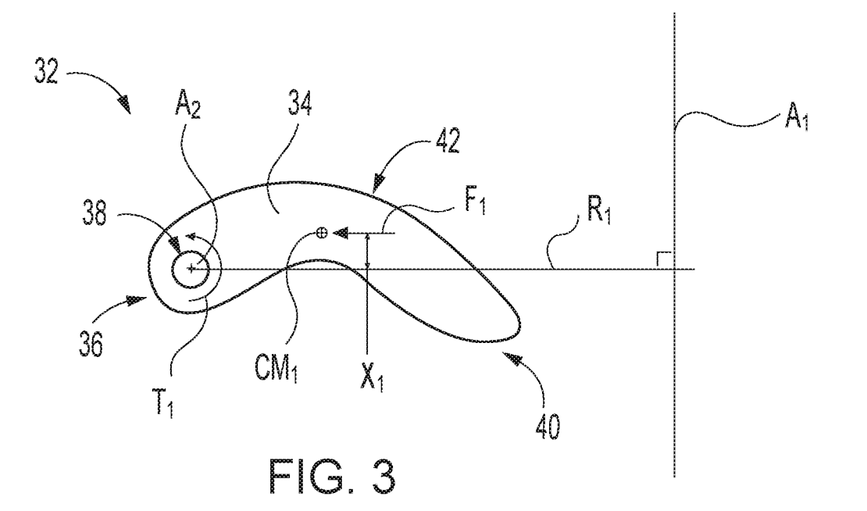
FIG. 3 is a side view of a prior art flyweight.

FIG. 3 shows a side view of a flyweight 32 in an initial, unengaged position (e.g., in a position correlating to a CVT clutch being stationary or rotating at idling speeds, such as shown in FIG. 1). The flyweight 32 includes a body 34 comprising a head 36 including a pivot 38, such as a bore for mounting on a pin of a CVT clutch, and an arm 40 extending from the head 36. The arm 40 may include a cam surface 42 that is curved and configured to interact with and apply a force to a spider assembly of the CVT clutch. When mounted on a CVT clutch, the flyweight 32 may rotate about an axis of rotation $A_1$ of the CVT clutch when the CVT clutch is rotated by a shaft, such as an engine crankshaft. Additionally, the flyweight 32 may be constrained to an axis of rotation $A_2$, relative to the CVT clutch, by the pivot 38. As shown, the axis of rotation $A_1$ of the CVT clutch and the axis of rotation $A_2$ of the flyweight 32 relative to the CVT clutch may be substantially perpendicular and the axis of rotation $A_2$ may be substantially tangential to the rotation of the CVT clutch. A reference line $R_1$ correlates to a radial direction relative to the rotation of the CVT clutch oriented substantially perpendicular to both the axis of rotation $A_1$ and the axis of rotation $A_2$ and intersecting both the axis of rotation $A_1$ and the axis of rotation $A_2$.

The flyweight 32 may exhibit a center-of-mass $CM_1$, which may be located approximately at the center of the flyweight 32. For a simplified, yet accurate, analysis of forces acting on the flyweight 32, the total inertial forces (e.g., centrifugal forces) acting on the flyweight 32 at any given time may be calculated as acting on the flyweight 32 at its center-of-mass $CM_1$. Accordingly, the inertial forces acting on the flyweight 32 as it is rotated by the CVT clutch, when observed in a rotating reference frame, can be approximated by an apparent centrifugal force $F_1$ acting in a radial direction. In the present case, the radial direction in which the apparent centrifugal force $F_1$ acts is a direction parallel to the reference line $R_1$, and perpendicular to both the axis of rotation $A_1$ and the axis of rotation $A_2$.

Because the flyweight 32 is constrained by the pivot 38 to rotation about the axis $A_2$, a portion of the apparent centrifugal force $F_1$ may press the pivot 38 of the flyweight 32 against a pivot mount of the CVT clutch (e.g., press a surface of a bore in the head 36 of the flyweight 32 against a surface of a pin the flyweight 32 is mounted on). Another portion of the apparent centrifugal force $F_1$ may apply a torque $T_1$ to the flyweight about the pivot 38. A simple way to approximate the torque $T_1$ applied to the flyweight 32 is to utilize the equation $T_1 = F_1 X_1$, wherein $X_1$ is the shortest distance between the center-of-mass $CM_1$ and the reference line $R_1$.

Figure 4:
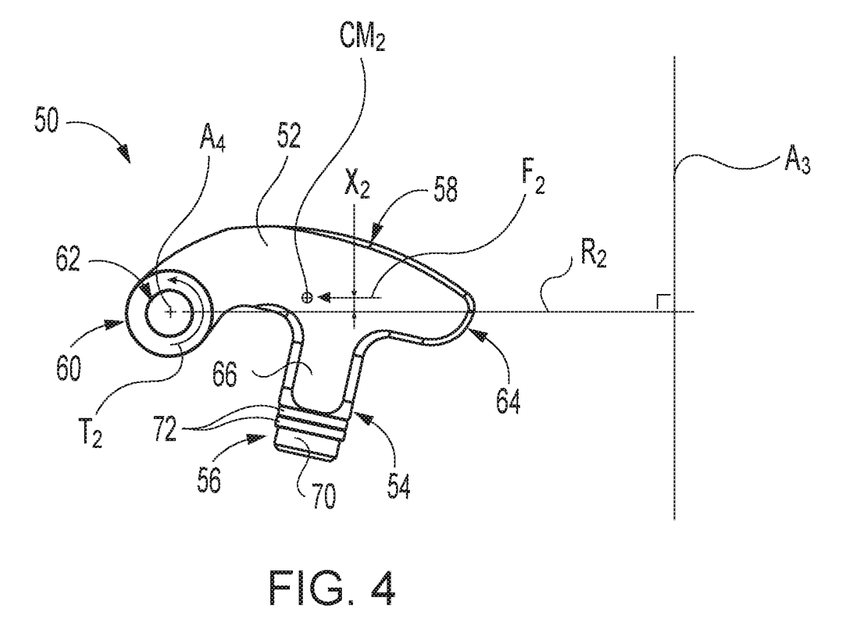
FIG. 4 is a side view of a flyweight including a first coupler according to an embodiment of the present disclosure.

FIG. 4 shows a side view of a flyweight 50 including a body 52 of the flyweight 50 having a first coupler 54 configured for the selectable addition of at least one first weight 56 distal from a cam surface 58 according to an embodiment of the present disclosure. The body 52 of the flyweight may include a head 60 including a pivot 62, such as a bore for mounting on a pin of a CVT clutch, and an arm 64 extending from the head 60. The arm 64 may include the cam surface 58 that is curved and configured to interact with and apply a force to a spider assembly of a CVT clutch. When mounted on a CVT clutch, the flyweight 50 may rotate about an axis of rotation $A_3$ of the CVT clutch when the CVT clutch is rotated by a shaft, such as an engine crankshaft. Additionally, the flyweight 50 may be constrained to an axis of rotation $A_4$, relative to the CVT clutch, by the pivot 62. As shown, the axis of rotation $A_3$ of the CVT clutch and the axis of rotation $A_4$ of the flyweight 50 relative to the CVT clutch may be substantially perpendicular and the axis of rotation $A_4$ may be substantially tangential to the rotation of the CVT clutch. A reference line $R_2$ correlates to a radial direction relative to the rotation of the CVT clutch oriented substantially perpendicular to both the axis of rotation $A_3$ and the axis of rotation $A_4$ and intersecting both the axis of rotation $A_3$ and the axis of rotation $A_4$.

The body 52 of the flyweight 50 includes the first coupler 54, which may include a protrusion 66 extending from a location distal from and opposing the cam surface 58. As shown in a cross-sectional view in FIG. 5, the protrusion 66 may include a threaded opening 68 for the coupling of a selectable mass, such as the at least one first weight 56 (e.g., a bolt 70 and washers 72), thereto. For example, the first coupler 54 may comprise helical threads 74 oriented along an axis $A_5$ that is substantially perpendicular to the cam surface 58. Accordingly, the first coupler 54 is configured to selectively couple the at least one first weight 56 to the body distal from the cam surface 58. Additionally, the helical threads 74 facilitate the movement of a coupled mass, such as the bolt 70, along the length of the first coupler 54, thus affecting the location of the center of mass $CM_2$ of the flyweight 50 relative to the cam surface 58.

Accordingly, referring again to FIG. 4, all of the mass or substantially all of the mass of the at least one first weight 56 coupled to the body 52 of the flyweight 50 via the first coupler 54 may be positioned below the reference line R2 when the flyweight 50 is installed in a CVT clutch. Because the at least one first weight 56 is attached to the first coupler 54 distal from the cam surface 58, below the reference line R2, all, or substantially all, of the mass of the at least one first weight 56 contributes to reduced torque $T_2$ about the pivot 62 related to an acceleration of the flyweight 50 in its initial, unengaged position in the CVT clutch.

In view of the location of the protrusion 66 and the at least one first weight 56 coupled to the body 52 of the flyweight 50 via the first coupler 54, the flyweight 50 may exhibit a center of mass $CM_2$ located relatively close to the reference line $R_2$. Accordingly, the shortest distance $X_2$ between the center of mass $CM_2$ and the reference line $R_2$ may be less than the distance $X_1$ (see FIG. 3). Because the mass added to the first coupler 54 is below the reference line $R_2$, the torque $T_2$ applied when the flyweight is in the resting position may decrease, rather than increase, as a result of the added mass. The torque $T_2$ may be equal to the force $F_2$ multiplied by the distance $X_2$. So, as the distance $X_2$ decreases, the torque $T_2$ applied from a given force will be reduced.

Figure 6:
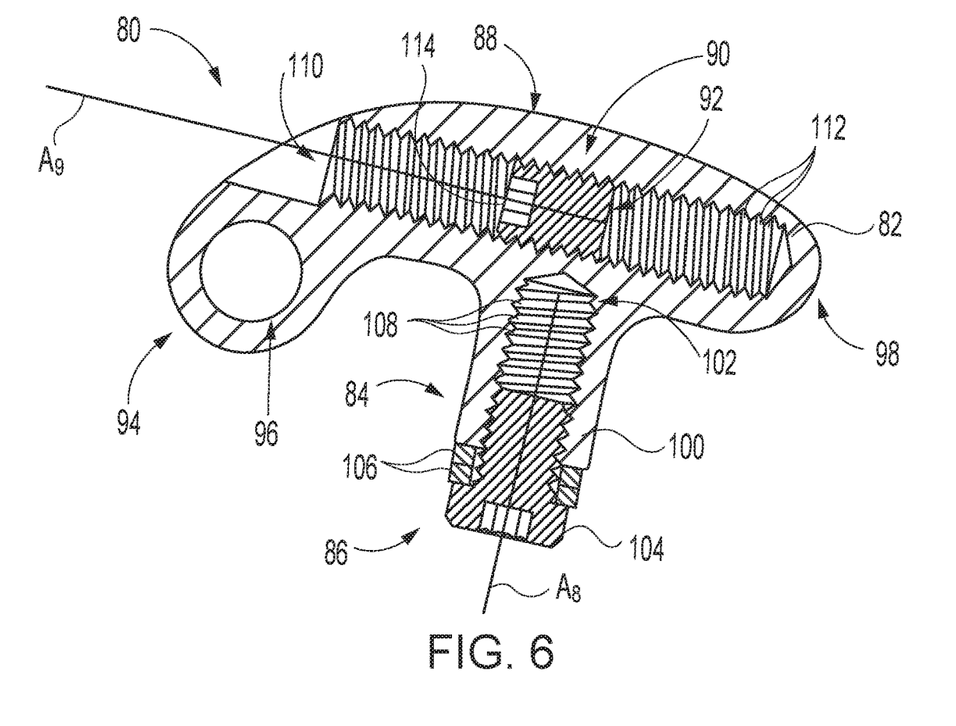
FIG. 6 is a cross-sectional view of a flyweight including a first coupler and a second coupler according to an embodiment of the present disclosure.

FIG. 6 shows a cross-sectional view of a flyweight 80 including a body 82 of the flyweight 80 having a first coupler 84 configured for the selectable addition of at least one first weight 86 distal from a cam surface 88, and the body 82 further comprises a second coupler 90 configured to selectively couple at least one second weight 92 to the body 82 of the flyweight 80 proximal to the cam surface 88 according to an embodiment of the present disclosure.

Figure 5:
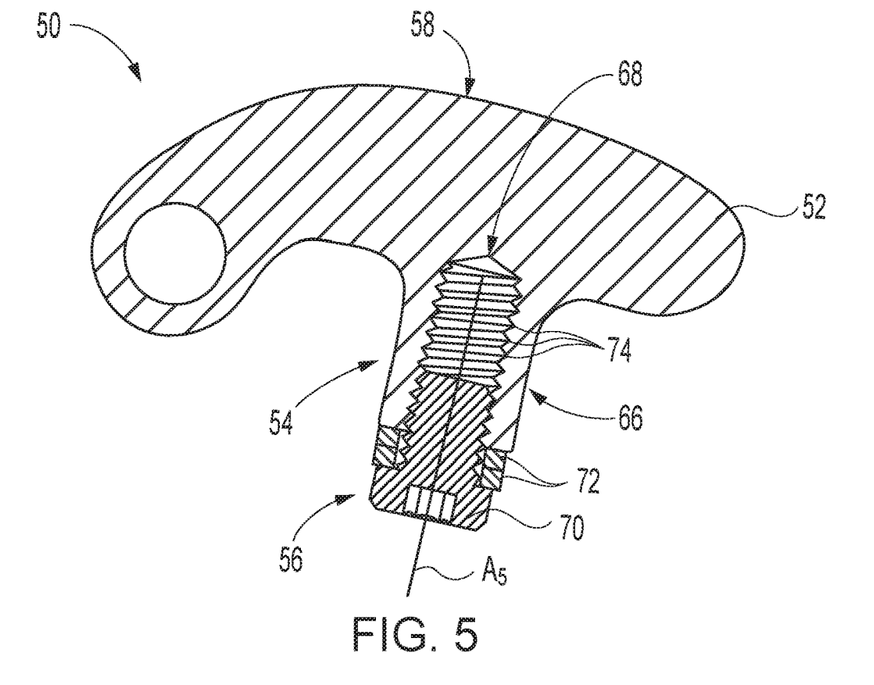
FIG. 5 is a cross-sectional view of the flyweight of FIG. 4.

Similar to the flyweight 50 of FIGS. 4-5, the body 82 of the flyweight 80 may include a head 94 including a pivot 96, such as a bore for mounting on a pin of a CVT clutch, and an arm 98 extending from the head 94. The arm 98 may include the cam surface 88 that is curved and configured to interact with and apply a force to a spider assembly of a CVT clutch.

Figure 7:
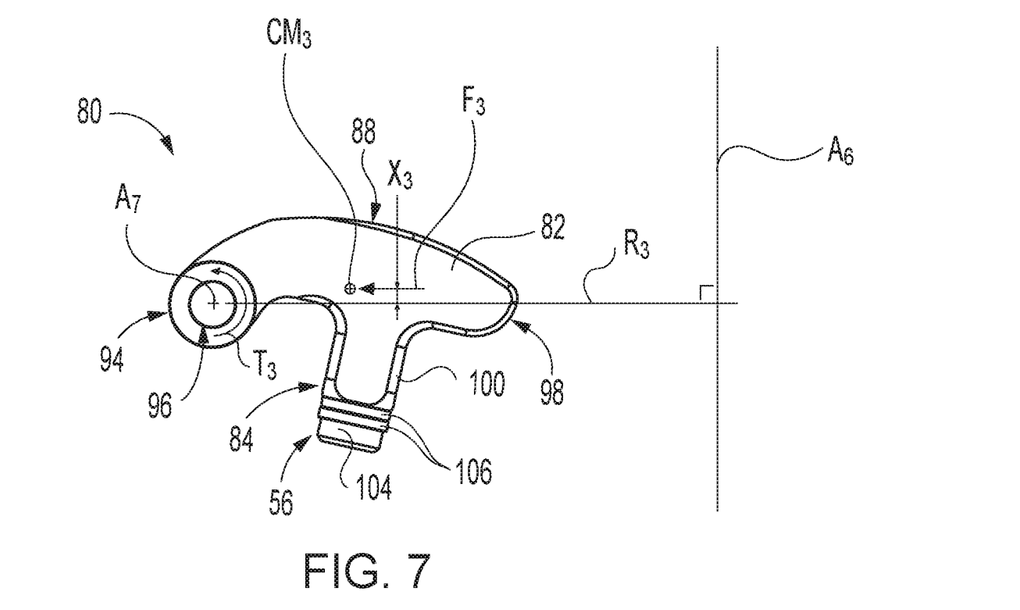
FIG. 7 is a side view of the flyweight of FIG. 6.

FIG. 7 shows a side view of the flyweight 80. When mounted on a CVT clutch, the flyweight 80 may rotate about an axis of rotation $A_6$ of the CVT clutch when the CVT clutch is rotated by a shaft, such as an engine crankshaft. Additionally, the flyweight 80 may be constrained to an axis of rotation $A_7$, relative to the CVT clutch, by the pivot 96. As shown, the axis of rotation $A_6$ of the CVT clutch and the axis of rotation $A_7$ of the flyweight 80 relative to the CVT clutch may be substantially perpendicular and the axis of rotation $A_7$ may be substantially tangential to the rotation of the CVT clutch. A reference line $R_3$ correlates to a radial direction relative to the rotation of the CVT clutch oriented substantially perpendicular to both the axis of rotation $A_6$ and the axis of rotation $A_7$ and intersecting both the axis of rotation $A_6$ and the axis of rotation $A_7$.

Referring to FIGS. 6-7, the body 82 of the flyweight 80 includes a protrusion 100 extending from a location distal from, and opposing, the cam surface 88. The protrusion 100 may include a threaded opening 102 for the coupling of a selectable mass, such as at least one first weight 86 (e.g., a bolt 104 and washers 106), thereto. For example, the first coupler 84 may comprise helical threads 108 oriented along an axis $A_8$ that is substantially perpendicular to the cam surface 88. Accordingly, the first coupler 84 is configured to selectively couple the at least one first weight 86 to the body distal from the cam surface 88. Additionally, the helical threads 108 facilitate the movement of a coupled mass, such as the bolt 104, along the length of the first coupler 84, thus affecting the location of the center of mass of the flyweight 80 relative to the cam surface 88.

Accordingly, all of the mass or substantially all of the mass of the at least one first weight 86 coupled to the body 82 of the flyweight 80 via the first coupler 84 may be positioned below the reference line $R_3$ when the flyweight 80 is installed in a CVT clutch. Because the at least one first weight 86 is attached to the first coupler 84 distal from the cam surface 88, below the reference line $R_3$, all, or substantially all, of the mass of the at least one first weight 86 contributes to reduced torque $T_3$ about the pivot 96 related to an acceleration of the flyweight 80 in its initial, unengaged position in the CVT clutch.

In view of the location of the protrusion 100 and the at least one first weight 86 coupled to the body 82 of the flyweight 80 via the first coupler 84, the flyweight 80 may exhibit a center of mass $CM_3$ located relatively close to the reference line $R_3$. Accordingly, the shortest distance $X_3$ between the center of mass $CM_3$ and the reference line $R_3$ may be less than the distance $X_1$ (see FIG. 3). Because the mass added to the first coupler 84 is below the reference line $R_3$, the torque $T_3$ applied when the flyweight 80 is in the resting position may decrease, rather than increase, as a result of the added mass. The torque $T_3$ may be equal to the force $F_3$ multiplied by the distance $X_3$. So, as the distance $X_3$ decreases, the torque $T_3$ applied from a given force will be reduced.

Additionally, the body 82 of the flyweight 80 includes the second coupler 90 proximal to the cam surface 88. The second coupler 90 may include a threaded opening 110 comprising helical threads 112 oriented along an axis $A_9$ oriented substantially perpendicular to the axis $A_8$ of the helical threads of the first coupler 84 and is configured for the coupling of the at least one second weight 92 (e.g., one or more set screws 114) thereto. Accordingly, all of the mass or substantially all of the mass of the at least one second weight 92 coupled to the body 82 of the flyweight 80 via the second coupler 90 may be positioned above the reference line $R_3$ when the flyweight 80 is installed in the CVT clutch (e.g., all, or substantially all, of the mass of the at least one second weight 92 contributes to increased torque $T_3$ about the pivot 96 related to a specific acceleration of the flyweight 80 in its initial, unengaged position in a CVT clutch).

In view of the location of the protrusion 100, additional mass may be selectably coupled to the body of the flyweight 80 via the first coupler 84 to move the center of mass $CM_3$ closer to the reference line $R_3$. Similarly, in view of the location of the second coupler 90 additional mass may be selectably coupled to the body 82 of the flyweight 80 via the second coupler 90 to move the center of mass $CM_3$ further from the reference line $R_3$. Additionally, the position of the at least one second weight 92 along the length of the second coupler 90 may affect the location of the center of mass $CM_3$ of the flyweight 80 relative to the pivot 96.

Adding the at least one second weight 92 distally from the pivot 96 via the second coupler 90 may move the center of mass $CM_3$ further from the pivot 96. This may not significantly affect the distance $X_3$ of the center of mass $CM_3$ relative to the reference line $R_3$, when compared to adding the at least one second weight 92 proximal to the pivot 96 via the second coupler 90. Accordingly, adding the at least one second weight 92 more distally from the pivot 96 may not have a significant effect on the torque $T_3$ when the flyweight 80 is in the initial, unengaged position, and thus may not have a significant effect on the engine speed (RPM) at which the initial engagement of the CVT clutch may occur. At higher engine speeds, however, the at least one second weight 92 positioned distally from the pivot 96 may significantly increase the torque $T_3$ applied to the flyweight 80 relative to the at least one second weight 92 positioned more proximal to the pivot 96.

Similarly, adding the at least one second weight 92 proximally to the pivot 96 via the second coupler 90 may move the center of mass $CM_3$ closer to the pivot 96. Adding the at least one second weight 92 more proximally to the pivot 96 may not have a significant effect on the torque $T_3$ when the flyweight 80 is in the initial, unengaged position, and thus may not have a significant effect on the engine speed (RPM) at which the initial engagement of the CVT clutch may occur. At higher engine speeds, however, the at least one second weight 92 positioned proximally to the pivot 96 may significantly decrease the torque $T_3$ applied to the flyweight 80 relative to the at least one second weight 92 positioned more distal from the pivot 96.

Accordingly, by using the at least one first weight 86 and the at least one second weight 92 attached to the first coupler 84 and the second coupler 90 in combination, a desired total mass of the flyweight 80 may be selected and a desired center of mass $CM_3$ location of the flyweight 80 may also be selected. The availability of selecting where the at least one first weight 86 and the at least one second weight 92 are attached to the first coupler 84 and the second coupler 90 facilitates the fine tuning of the location of the center of mass $CM_3$ of the flyweight 80 relative to both the pivot 96 and the cam surface 88. This may provide a significant advantage over tuning systems that require any added weight be positioned at discrete locations, rather than being positionable to any of an infinite number of positions along a path of the first coupler 84 and/or the second coupler 90. These advantages include both the ability to fine tune the location of the center of mass $CM_3$ of the flyweight 80, and the ease of moving the center of mass $CM_3$ of the flyweight 80, even in the field, with the simple turn of a tool.

In some embodiments, the protrusion 100 may comprise a threaded shaft and the at least one second weight 92 may comprise fasteners such as nuts and/or sleeves.

The material density of the at least one first weight 86 and the at least one second weight 92 may be selected to provide a desired mass for a desired size. For example, an aluminum alloy may have a density of about 2.7 grams per cubic centimeter (2.7 $g/cm^3$), whereas tungsten may have a density of about 19.3 $g/cm^3$. Accordingly, a specific material may be selected to provide a desired mass per a specific size (e.g., volume) of the at least one first weight 86 and the at least one second weight 92. Additionally, the material density of the body 82 of the flyweight 80 may be selected. For example, the material selected for the body 82 of the flyweight 80 may be less dense than the material selected for the at least one first weight 86 and the at least one second weight 92. Accordingly, a significant portion of the total mass of the flyweight 80 may be attributed to the mass of the at least one first weight 86 and the at least one second weight 92, which may facilitate the movement of the location of the center of mass $CM_3$ of the flyweight 80 to a desired location with the at least one first weight 86 and the at least one second weight 92.

Figure 8:
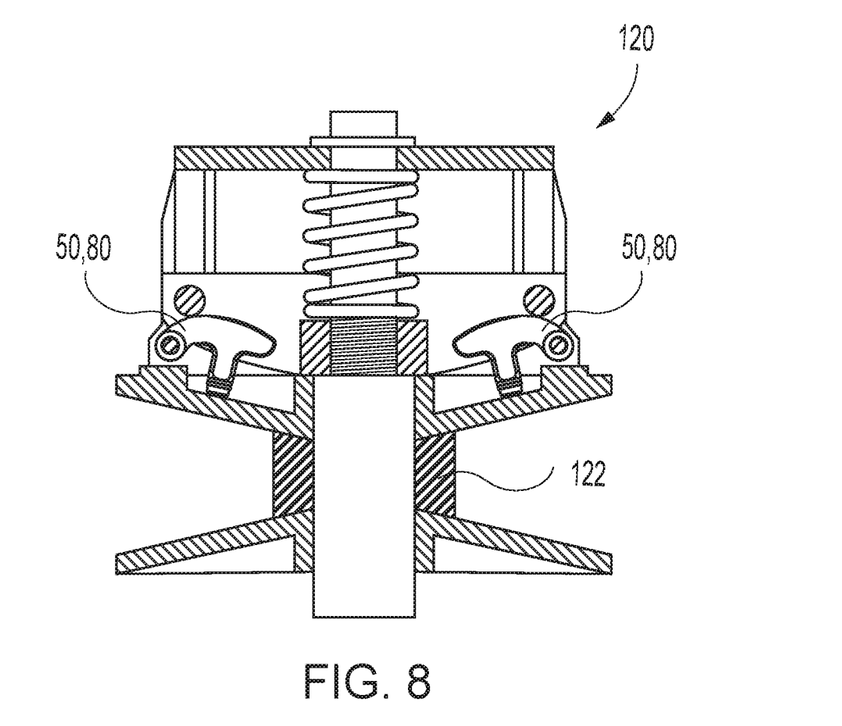
FIG. 8 is a partial cross-sectional view of a CVT clutch according to an embodiment of the present disclosure.

As shown in FIG. 8, one or more of the flyweights 50 and/or the flyweights 80 may be utilized in a CVT clutch 120 of a vehicle, such as a snowmobile, a utility task vehicle (UTV), or an all-terrain vehicle (ATV), according to an embodiment of the present disclosure. The CVT clutch 120 may be tuned for a specific engine and/or for a specific performance characteristic.

Referring again to FIG. 6, the at least one first weight 86 may be coupled to the body 82 of each flyweight 80 via the first coupler 84. The at least one second weight 92 may be coupled to the body 82 of each flyweight 80 via the second coupler 90. For example, the at least one second weight 92 may be configured as the set screw 114. The at least one second weight 92 may be positioned at the center of, or proximate thereto, the second coupler 90.

Referring now to FIGS. 6 and 8, the vehicle comprising the CVT clutch 120 may then be operated and evaluated with the initially configured flyweights 80 installed. If, after operation and evaluation, it is desired to increase the RPM at which the CVT clutch 120 engages a belt 122, additional mass may be coupled to the body 82 of each flyweight 80 via the first coupler 84. If, after operation and evaluation, it is desired to decrease the RPM at which the CVT clutch 120 engages the belt 122, mass may be removed from the body 82 of each flyweight 80 via the first coupler 84. The vehicle comprising the CVT clutch 120 may then be operated and evaluated again with the reconfigured flyweights 80 installed. After operation and evaluation, additional mass may be coupled to or some mass may be removed from the body 82 of each flyweight via the at least one first weight 86 and the first coupler 84. The process of operation and evaluation and the addition or removal of mass from the body 82 of each flyweight 80 via at least one first weight 86 and the first coupler 84 may be repeated until a desired initial engagement or "off-the-line" performance is achieved.

After the desired initial engagement or "off-the-line" performance is achieved, the vehicle comprising the CVT clutch 120 may then be operated and evaluated at mid and/or high RPM ranges. If, after operation and evaluation at mid and/or high RPM ranges, it is desired to shift into higher gear ratios more quickly, the at least one second weight 92 may be moved further away from the pivot 96 of each flyweight 80. If, after operation and evaluation at mid and/or high RPM ranges, it is desired to shift into higher gear ratios more slowly, the at least one second weight 92 may be moved closer to the pivot 96 of each flyweight 80. The vehicle comprising the CVT clutch 120 may then again be operated and evaluated at mid and/or high RPM ranges. The process of operation and evaluation at mid and/or high RPM ranges and the movement of mass nearer or further from the pivot 96 of each flyweight 80 via the at least one second weight 92 and the second coupler 90 may be repeated until a desired performance is achieved at mid and/or high RPM ranges. Additionally, the total mass and the center of mass location of the second weight 92 may be achieved by adding and/or removing various weights. For example, multiple set screws may be utilized as the at least one second weight 92, which may be added and/or removed from the second coupler 90.

In some embodiments, the second coupler 90 may comprise the threaded opening 102 and the at least one second weight 92 may include corresponding threads. Accordingly, the distance the at least one second weight 92 is moved within each flyweight 80 may be determined by counting the numbers of rotations and/or partial rotations applied to the at least one second weight 92 within the second coupler 90. This may facilitate a consistent positioning of the at least one second weight 92 within each of the flyweights 80. Additionally, this may facilitate the repositioning of the at least one second weight 92 by the mere rotation of a tool, such as a hex key (e.g., an ALLEN® wrench). Furthermore, the location of the second coupler 90 and the at least one second weight 92 may facilitate the movement of the at least one second weight 92 closer to and/or further from the pivot 96 of the flyweight 80 while the flyweight 80 remains installed on the CVT clutch 120. This may facilitate ease of tuning the flyweights 80 and the CVT clutch 120 in the field quickly, and with a single tool.

Figure 9:
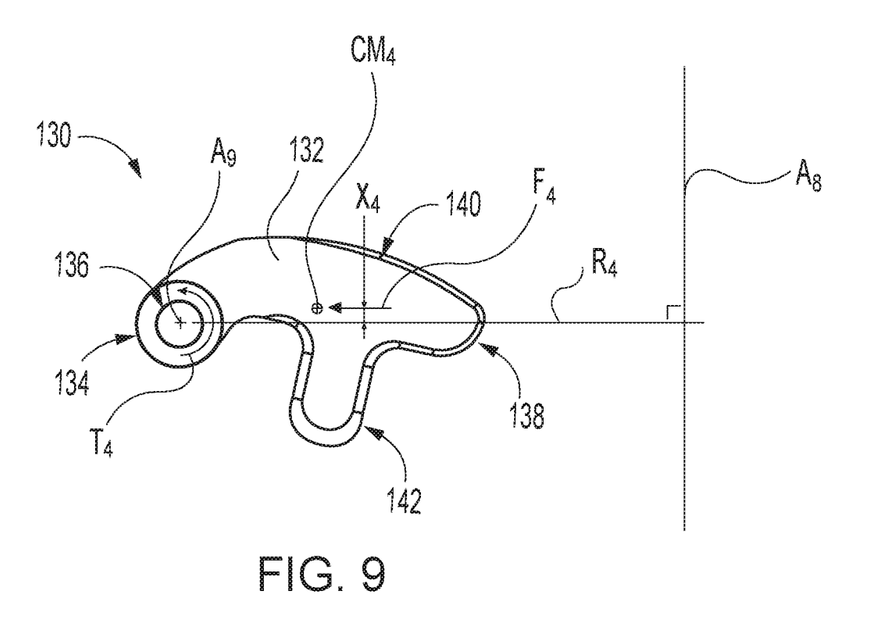
FIG. 9 is a side view of a flyweight without a coupler according to an embodiment of the present disclosure.

In further embodiments, as shown in FIG. 9, a desired mass and center of mass location may be known, and a flyweight 130 according to an embodiment of the present disclosure may be provided without any coupler for the coupling of additional mass. The body 132 of the flyweight 130 may include a head 134 including a pivot 136, such as a bore for mounting on a pin of a CVT clutch, and an arm 138 extending from the head 134. The arm 138 may include the cam surface 140 that is curved and configured to interact with and apply a force to a spider assembly of a CVT clutch. When mounted on a CVT clutch, the flyweight 130 may rotate about an axis of rotation $A_8$ of the CVT clutch when the CVT clutch is rotated by a shaft, such as an engine crankshaft. Additionally, the flyweight 130 may be constrained to an axis of rotation $A_9$, relative to the CVT clutch, by the pivot 136. As shown, the axis of rotation $A_8$ of the CVT clutch and the axis of rotation $A_9$ of the flyweight 130 relative to the CVT clutch may be substantially perpendicular and the axis of rotation $A_9$ may be substantially tangential to the rotation of the CVT clutch. A reference line $R_4$ correlates to a radial direction relative to the rotation of the CVT clutch oriented substantially perpendicular to both the axis of rotation $A_8$ and the axis of rotation $A_9$ and intersecting both the axis of rotation $A_8$ and the axis of rotation $A_9$.

The body 132 of the flyweight 130 may include a substantial portion of the mass of the body 132 located below the reference line $R_4$, thus contributing to negative torque about the pivot related to an acceleration of a CVT clutch from an idling condition. In some embodiments, at least 20% of the mass of the body 132 is positioned below the reference line $R_4$, to contribute negative torque about the pivot 136 related to an acceleration of a CVT clutch from an idling condition. In some embodiments, at least 25% of the mass of the body 132 is positioned below the reference line $R_4$, to contribute negative torque about the pivot 136 related to an acceleration of a CVT clutch from an idling condition. In further embodiments, between about 25% and 30% of the mass of the body 132 is positioned below the reference line $R_4$, to contribute negative torque about the pivot 136 related to an acceleration of a CVT clutch from an idling condition. In yet further embodiments, about 29% of the mass of the body 132 is positioned below the reference line $R_4$, to contribute negative torque about the pivot 136 related to an acceleration of a CVT clutch from an idling condition.

The body 132 of the flyweight 130 may include one or more protrusions 142 extending from the body 132 distally from the cam surface 140 to facilitate the distribution of a substantial portion of the mass of the body 132 below the reference line $R_4$. In some embodiments, the protrusion 142 may be located closer to the pivot 136 than shown, or may be located closer to the end of the arm 138. Additionally, more than one protrusion 142 may be included. The location of one or more protrusions 142 may be chosen to locate the center of mass $CM_4$ in a preferred location, and the location may also be chosen to prevent mechanical interference with other components of a CVT clutch.

In view of the distribution of the mass of the body 132, the flyweight 130 may exhibit a center of mass $CM_4$ located relatively close to the reference line $R_4$. Accordingly, the shortest distance $X_4$ between the center of mass $CM_4$ and the reference line $R_4$ may be less than the distance $X_1$ (see FIG. 3). Because a substantial portion of the mass of the body 132 is below the reference line $R_4$, the torque $T_4$ applied when the flyweight 130 is in the resting position may decrease, rather than increase, as a result of the mass included below the reference line $R_4$.

Figure 10:
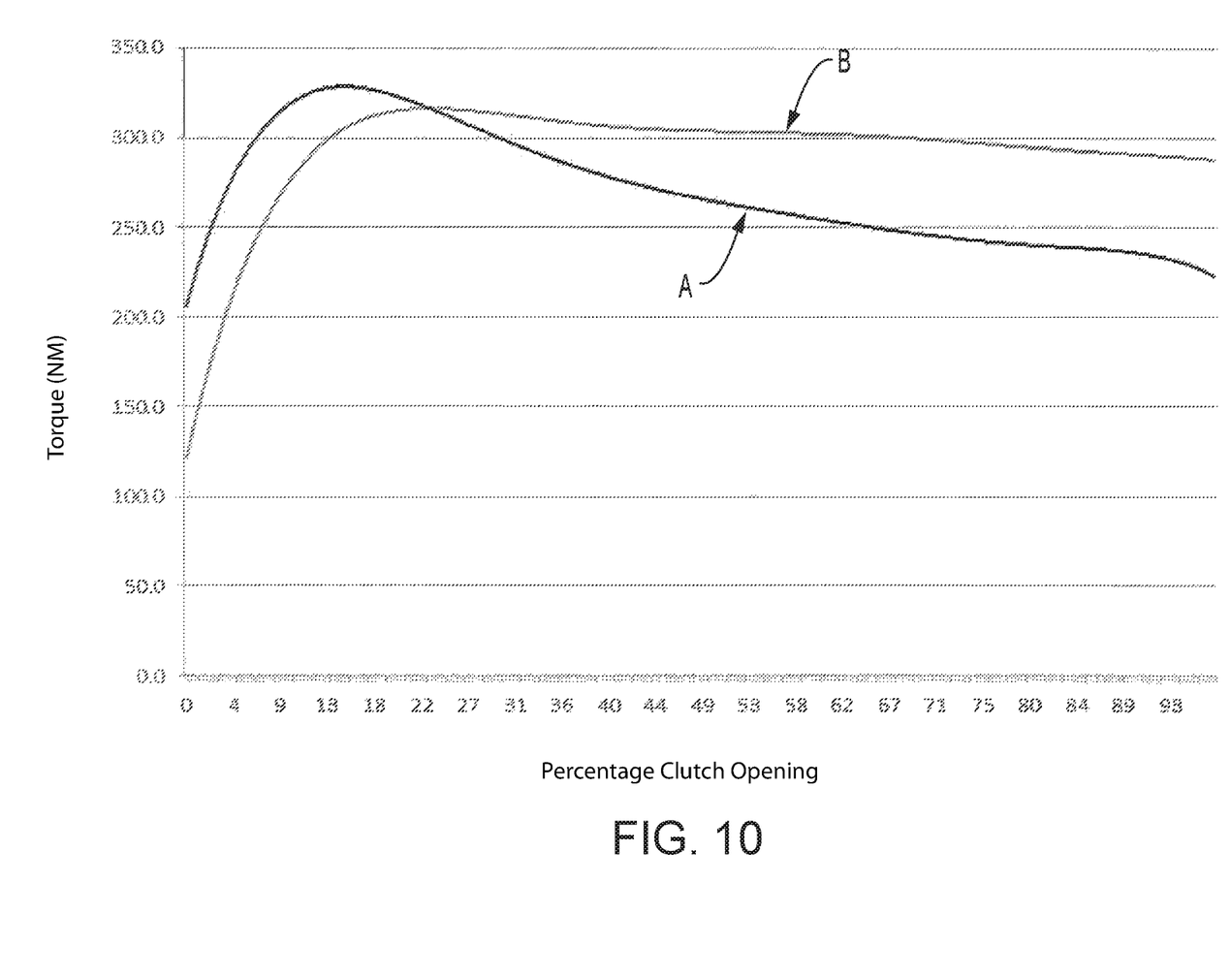
FIG. 10 is a graph with curves showing torque output relative to the percentage of clutch opening.

FIG. 10 shows a graph with curves A, B showing torque output from an engine via a CVT clutch in Newton Meters (NM) relative to the percentage of clutch opening. The curve A shows the torque output with a CVT clutch utilizing prior art flyweights. The curve B shows the torque output with a CVT clutch utilizing flyweights according to an embodiment of the present disclosure. As shown in the graph, the CVT clutch utilizing flyweights according to an embodiment of the present disclosure provides improved torque output, and thus may provide improved acceleration to a vehicle, relative to the prior art. Also, a substantial portion of the mass of the body of the flyweight according to embodiments of the present disclosure that applies negative torque to the flyweight in the resting position (0% clutch opening) may move to a location wherein the mass applies additional positive torque about the pivot of the flyweight as the clutch opens as can be observed from curve B of the graph at about 25% clutch opening. This transition, which may occur at about 25% clutch opening, from applying negative torque to applying additional positive torque, may correspond to a booster, such as a turbocharger, engaging to provide improved efficiency and power to the engine.

The embodiments of the disclosure described above and illustrated in the accompanying drawings do not limit the scope of the disclosure, which is encompassed by the scope of the appended claims and their legal equivalents. Any equivalent embodiments are within the scope of this disclosure. Indeed, various modifications of the disclosure, in addition to those shown and described herein, such as alternate useful combinations of the elements described, will become apparent to those skilled in the art from the description. Such modifications and embodiments also fall within the scope of the appended claims and equivalents.

What is claimed is:

1. A flyweight comprising:
    a body, the body comprising:
        a pivot;
        a cam surface; and
        a first coupler configured to selectively couple at least one first weight to the body distal from the cam surface; and
        a second coupler, the second coupler configured to selectively couple at least one second weight to the body of the flyweight proximal to the cam surface.

2. The flyweight of claim 1, wherein the first coupler comprises helical threads oriented along an axis that is substantially perpendicular to the cam surface.

3. The flyweight of claim 1, wherein the first coupler comprises a protrusion.

4. The flyweight of claim 1, further comprising at least one first weight coupled to the first coupler such that substantially all of the mass of the at least one first weight contributes to reduced torque about the pivot related to an acceleration of the flyweight in its initial, unengaged position in a CVT clutch.

5. The flyweight of claim 4, wherein the at least one first weight comprises a bolt.

6. The flyweight of claim 5, wherein the at least one first weight further comprises at least one washer.

7. The flyweight of claim 4, wherein the at least one first weight has a density greater than a density of the body.

8. The flyweight of claim 1, wherein the second coupler comprises helical threads oriented along an axis that is substantially perpendicular to the axis of the helical threads of the first coupler.

9. The flyweight of claim 8, further comprising at least one second weight coupled to the second coupler such that substantially all of the mass of the at least one second weight contributes to increased torque about the pivot related to an acceleration of the flyweight in its initial, unengaged position in a CVT clutch.

10. The flyweight of claim 9, wherein the at least one second weight comprises a setscrew.

11. The flyweight of claim 9, wherein the at least one second weight has a density greater than a density of the body.

12. A method of tuning a flyweight, the method comprising;
attaching at least one first weight to a first coupler of a body of the flyweight distal from a cam surface of the body, wherein attaching the at least one first weight to the first coupler of the body of the flyweight distal from the cam surface of the body comprises attaching the at least one first weight such that substantially all of the mass of the at least one first weight contributes to reduced torque about a pivot related to an acceleration of the flyweight in its initial, unengaged position in a CVT clutch; and
attaching at least one second weight to a second coupler proximal to the cam surface such that substantially all of the mass of the at least one second weight contributes to increased torque about the pivot related to an acceleration of the flyweight in its initial, unengaged position in a CVT clutch.

13. The method of claim 12, further comprising rotating the at least one second weight relative to the second coupler to move the mass of the second weight relative to a pivot of the flyweight.

14. A CVT clutch comprising:
a flyweight comprising:
a body, the body comprising:
a pivot;
a cam surface; and
a first coupler configured to selectively couple at least one first weight to the body distal from the cam surface;
at least one first weight coupled to the first coupler such that substantially all of the mass of the at least one first weight contributes to reduced torque about the pivot related to an acceleration of the CVT clutch from an idling condition; and
at least one second weight coupled to a second coupler proximal to the cam surface such that substantially all of the mass of the at least one second weight contributes to increased torque about the pivot related to an acceleration of the CVT clutch from an idling condition.

15. The CVT clutch of claim 14, wherein at least one of the at least one first weight and the at least one second weight have a density greater than a density of the body of the flyweight.

16. A flyweight comprising:
a body, the body comprising:
a pivot; and
a cam surface; and
a protrusion extending from the body distally from the cam surface, the protrusion including a first coupler configured to selectively couple at least one first weight to the body distal from the cam surface, wherein the at least one first weight has a density greater than a density of the body;
wherein at least 20% of the mass of the body is positioned to contribute negative torque about the pivot related to an acceleration of a CVT clutch from an idling condition.

17. The flyweight of claim 16, wherein at least 25% of the mass of the body is positioned to contribute negative torque about the pivot related to an acceleration of a CVT clutch from an idling condition.

18. The flyweight of claim 16, wherein between about 25% and 30% of the mass of the body is positioned to contribute negative torque about the pivot related to an acceleration of a CVT clutch from an idling condition.

19. The flyweight of claim 16, wherein about 29% of the mass of the body is positioned to contribute negative torque about the pivot related to an acceleration of a CVT clutch from an idling condition.

* * * * *